C. D. BAILEY.
PEDAL LOCK.
APPLICATION FILED MAR. 23, 1921.
1,415,425.
Patented May 9, 1922.
2 SHEETS—SHEET 1.
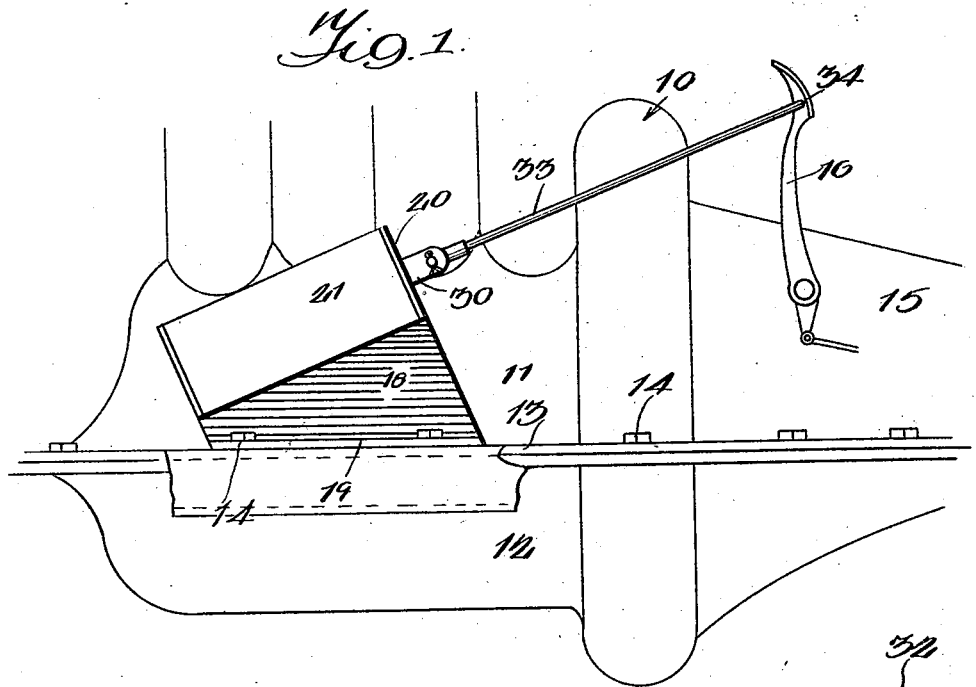
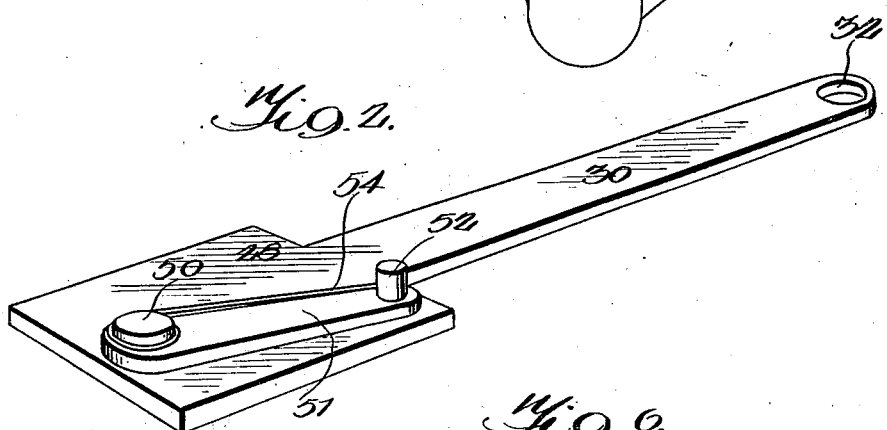
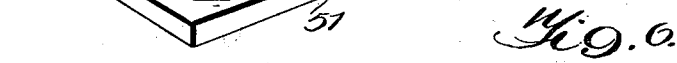
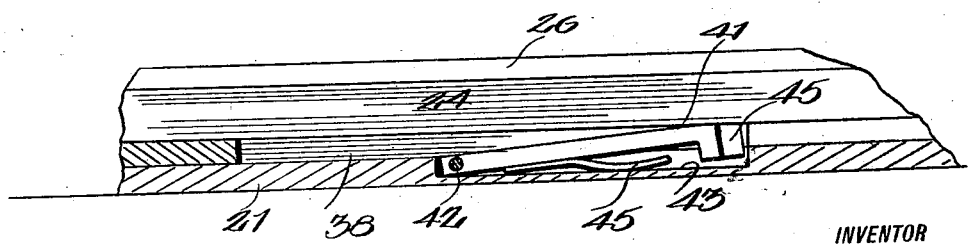
WITNESSES
INVENTOR
C. D. Bailey,
BY
ATTORNEYS

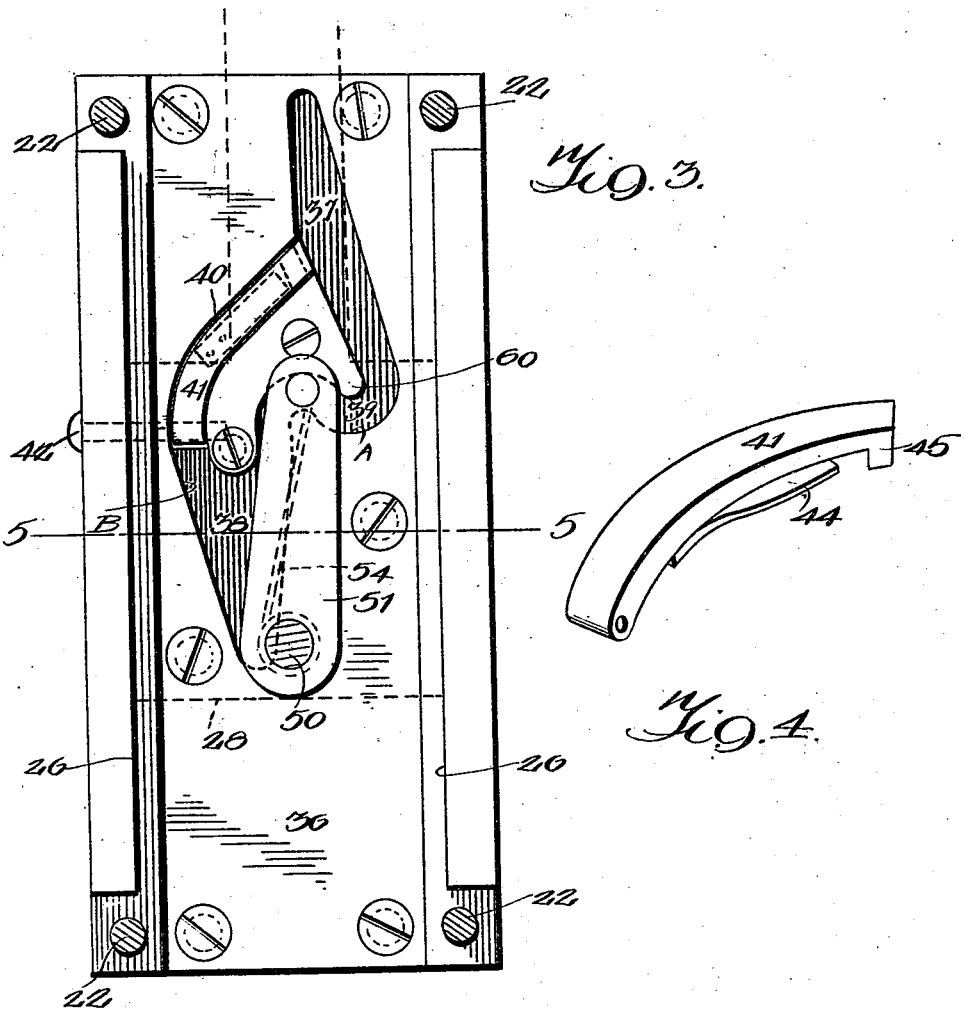

UNITED STATES PATENT OFFICE.

CURTIS DILLON BAILEY, OF MASSILLON, OHIO.

PEDAL LOCK.

1,415,425.　　　　Specification of Letters Patent.　　Patented May 9, 1922.

Application filed March 23, 1921. Serial No. 454,712.

*To all whom it may concern:*

Be it known that I, CURTIS DILLON BAILEY, a citizen of the United States, and a resident of Massillon, in the county of Stark and State of Ohio, have invented certain new and useful Improvements in Pedal Locks, of which the following is a specification.

This invention relates to improvements in locks especially adapted for use in connection with the clutch pedal of a planetary transmission such as is used on the Ford automobile.

Briefly stated, this invention embodies a lock having novel means whereby the clutch pedal of a planetary transmission may be held in its intermediate or neutral position when it is desired to temporarily break the engagement between the engine and the drive wheels.

A further object of the invention is to provide a clutch pedal lock having novel means whereby the operator is prevented from moving the clutch pedal directly from its high speed position to its low speed position should he accidentally apply more force to the pedal than is necessary to advance it to its neutral position when endeavoring to stop promptly in an emergency.

Other objects and advantages will be apparent during the course of the following description.

In the accompanying drawings forming a part of this application and in which like numerals are employed to designate like parts throughout the same, Figure 1 is a side elevation of the improved pedal lock applied, Figure 2 is a perspective of an arm or plunger embodied in the invention, Figure 3 is a sectional view through a cam block embodied in the invention, the plunger being shown in dotted lines, Figure 4 is a perspective view of a latch employed for closing the outlet end of a return branch embodied in the cam block, Figure 5 is a vertical transverse sectional view through the device, Figure 6 is a detail sectional view through the cam block, the view illustrating the application of the latch illustrated in Figure 4.

In the drawings wherein for the purpose of illustration is shown a preferred embodiment of the invention, the numeral 10 generally designates an internal combustion engine which is of the type used in the Ford automobile and which includes a crank case 11 and an oil pan 12. The adjacent edges of the crank case 11 and the oil pan 12 are formed with laterally projecting flanges 13 which are detachably connected by means of screw bolts 14.

As is well known, the motor used in the Ford automobile is of the unitary power type and has a speed change mechanism arranged within a transmission case designated by the numeral 15. The planetary transmission of the motor is operated by a clutch pedal 16 which is moved to its foremost position when it is desired to throw the transmission into low speed, so to speak. When it is desired to throw the transmission into high speed the clutch pedal 16 is released and the clutch spring associated therewith immediately returns the pedal to its rearmost position whereupon the transmission operates in high speed. The neutral position of the clutch pedal 16 is between the high and low speed positions of the same and as no means are ordinarily provided for indicating to the operator a neutral position of the clutch pedal he frequently pushes the pedal too far forwardly and causes the transmission to operate in low speed.

The invention forming the subject matter of this application is designed to prevent the operator from accidentally throwing the transmission into low speed and to accomplish the objects previously set forth.

Specifically, this invention includes a metallic plate 18 having its lower longitudinal edge portion extended laterally to form an attaching flange 19 which is secured to the frame of the chassis in any suitable manner. The attaching flange 19 is formed by bending one end portion of the body 18 along a diagonal line so that the body is tilted longitudinally as indicated in Figure 1.

The attaching plate 18 has its upper longitudinal edge portions formed with laterally projecting flanges 20 which form the end walls of a cam block designated by the numeral 21. The cam block which is in the form of an elongated body is confined between the end walls 20 and is secured to the attaching plate 18 by means of fastening devices 22 which may be cap screws or the like. As illustrated in Figure 5 the cam block is provided with a pair of spaced parallel upstanding side walls 24 which have their opposed sides rabbeted as indicated at 26 to form guides for the head 28 of a longitudinally movable plunger or arm 30. The adjacent portion of the attaching plate 18 forms a closure for the cam block and thereby holds the head 28 of the plunger within the cam block. However, it will be noted that the attaching plate 18 is spaced slightly from the head 28 by the upstanding side walls 24. Before proceeding to the specific description of the cam block it might be stated that the plunger 30 is formed at its rear end with an opening 32 to receive the laterally projecting forward end portion of a link 33 which is pivoted to the terminal portion of the pedal 16 as indicated at 34. Therefore, it will be apparent that when the clutch pedal 16 is moved to its advanced position for throwing the transmission into low speed the plunger 30 will be advanced to a corresponding extent. Also, when the pedal 16 is released the spring tension on the same will draw the plunger 30 rearwardly.

The cam block is formed with a detachable plate 36 which is provided with a longitudinally extending slot or channel having a rear branch 37 corresponding to the high speed position of the clutch pedal. The aforesaid slot or channel is also provided with a branch 38 which corresponds to or represents the low speed position of the clutch pedal. Communication is established between the slots 37 and 38 by means of a transversely extending longitudinally curved slot or channel 39 which has one end formed with what might be termed a locking notch or recess.

The plate 36 is also provided with a branch 40 which has its entrance end opening into the outlet end of the branch 38 and its own outlet end opening into the intermediate portion of the branch 37. The outlet end of the branch 40 which opens into the intermediate portion of the branch 37 is normally closed by means of a latch 41 which is pivoted at its rear end portion by means of a pivot pin 42 threaded into one side of the cam block.

The latch extends for the entire length of the return branch 40 and is seated within a longitudinally curved recess 43 in the bottom of the branch 40. A leaf spring 44 is connected to the under side of the longitudinally curved latch 41 and serves to urge the latch upwardly so that the enlarged terminal portion 45 of the same will normally close the outlet end of the branch 40. In other words, the enlarged end 45 of the latch shuts off communication between the branch 37 and the return branch 40.

As illustrated in Figure 2, the enlarged head 28 is formed at its forward portion with a pivot element 50 to which an arm 51 is pivotally connected. The arm 51 is movable across the face of the head 28 and is provided with a laterally projecting pin 52 which is movable in the branches 37, 38, 39, and 40. A spring 54 has one end portion coiled about or otherwise secured to the head of the pivot pin 50 and its other end connected to the pin 52 so as to urge the arm 51 to the position illustrated in Figure 2.

When the improved lock is applied the head 28 is slidably arranged within the cam block and the pin 52 is extended into the channel having the branches 37 to 40 inclusive. When the clutch pedal is in its high speed or retracted position the pin 52 will be located within the rear portion of the slot 37.

When it is desired to temporarily advance the clutch pedal to its neutral position and lock the same there, the clutch pedal is advanced until the pin 52 enters the communicating branch 39 and strikes the wall A. When the pin 52 is thus engaged with the wall A, the forward movement of the clutch pedal 16 is stopped so that the operator is prevented from accidentally going into low speed. Incidentally, it might be stated that the transverse branch 39 represents or corresponds to a neutral position of the clutch pedal and when the pin is within the branch 39 the clutch pedal is in its neutral position.

Immediately upon moving the pedal 16 forwardly so that the pin 39 contacts with the wall A, the operator may release his foot and permit the spring 54 to swing the arm 51 and consequently the pin 52 laterally so that the pin will move to one side of a lobe 60 formed in the cam plate. The lobe 60 prevents the spring tension on the clutch pedal from drawing the plunger rearwardly and thereby returning the clutch pedal to its high speed position. With the pin 52 thus held in the transverse branch 39 the clutch is locked in its neutral position. The clutch pedal, may, however, be advanced to its low speed position since the spring 54 urges the pin 52 in the direction of the entrance end of the slot 38. When the pin enters the slot 38 it immediately moves over to the wall B of the same due to the tension of the spring 54. When it is desired to throw the transmission into high speed the foot is released and the pin will move rearwardly through the return branch 40.

When the pin 52 is moved rearwardly through the branch 40 the latch 41 is depressed so that the pin 52 may enter the intermediate portion of the branch 37. It will be noted that the enlarged end 45 of the latch prevents the pin from entering the branch 40 from the branch 37.

With reference to the foregoing description it will be apparent that the only attention necessary on the part of the operator is to release the foot when the pedal reaches its neutral position. By reason of the construction described and illustrated, the operator is prevented from throwing the lever directly from its high to its low speed position.

Assuming that the car to which the improved lock is attached is descending a hill and the operator desires to throw the transmission into neutral, he merely pushes the pedal 16 forwardly and thereby locks the pin 52 within the transverse channel 39. When it is desired to return the lever 16 to its rearmost position for operating the car in high gear, the pedal is advanced slightly so that the pin 52 enters the rear portion of the slot 38. However, when the pin 52 enters the rear portion of the slot 38, the transmission is not thrown into low gear but continues in neutral. The spring 54 immediately throws the pin 52 to the wall B of the low speed channel 38 and by releasing the foot on the pedal 16, the pin 52 will travel rearwardly through the return branch 40. It is thus possible to throw the transmission into neutral and return the same to high gear without going into low gear. Since the pedal 16 must be at two extreme positions to operate the transmission in high or low gear, the movement of the pin 52 through the branch 39 and the adjacent portions of the branches 37 and 38 will not throw the transmission into either high or low gear.

In use, the device takes the place of the combined hand brake and clutch lever so that it is not necessary to operate the clutch lever by the hand when it is desired to lock the transmission in its neutral position.

Having thus described the invention, what is claimed is:—

1. A pedal lock comprising a body having a channel provided with branches representing the high and low speed positions of a pedal, and a pedal operated pin movable in said branches.

2. A clutch pedal lock comprising a body having a channel provided with branches representing the high and low speed positions of a clutch pedal and with a branch establishing communication between said branches and representing the intermediate position of the clutch pedal, and a pedal operated device movable in said branches.

3. A clutch pedal lock comprising a pedal operated arm having a pin, and a body having a channel provided with branches representing the high and low speed positions of the clutch pedal and with a transverse branch establishing communication with said branches and representing the neutral position of the clutch pedal, said pin being movable in said first and second named branches.

4. The construction set forth in claim 3 and means urging said pin laterally.

5. A clutch pedal lock comprising an arm having a pin, a body having a channel provided with communicating branches receiving said pin, said arm being provided with means urging said pin laterally, and a supporting device for said body.

6. A clutch pedal lock comprising a body having a channel provided with branches representing the high and low speed positions of a clutch pedal and with a branch establishing communication between said branches and representing the neutral position of the clutch pedal, said channel being provided with a return branch communicating with said first named branches, and a longitudinally movable member having a pin movable in said channel.

7. A clutch pedal lock comprising a body having a channel provided with branches representing the high and low speed positions of a clutch pedal and with a branch establishing communication between said branches and representing the neutral position of the clutch pedal, said channel being provided with a return branch communicating with said first named branches, and means normally closing the outlet end of said return branch.

8. A clutch pedal lock comprising a body having a channel provided with branches representing the high and low speed positions of a clutch pedal and with a one-way branch establishing communication between said branches and representing the neutral position of the clutch pedal, said channel being provided with a return branch communicating with the outlet end of one of said branches and with the intermediate portion of the other branch, and a latch normally closing the outlet end of said return branch.

9. The construction set forth in claim 8 and a pin movable in said channel.

10. The construction set forth in claim 8 and a spring actuated pin movable in said channel.

CURTIS DILLON BAILEY.